United States Patent Office 2,816,097
Patented Dec. 10, 1957

2,816,097

HYDROGENATION CATALYST REMOVAL WITH MONTMORILLONITE CLAY

George E. Hanson, Bartlesville, Okla., assignor to Phillips Petroleum Company, a corporation of Delaware No Drawing. Application February 14, 1955, Serial No. 488,151

11 Claims. (Cl. 260—85.1)

This invention relates to catalyst separation. In a more specific aspect this invention relates to the removal of catalyst from hydrogenated polybutadiene.

In recent years considerable study has been devoted to the production of polymeric materials of high tensile strength, good color, or other physical properties. It has been found that certain physical properties of butadiene homopolymers or copolymers wherein butadiene is the major constituent are greatly improved by hydrogenation in the presence of a catalyst. After the hydrogenation reaction, the catalyst is recovered for reactivation and reuse. In general, 85 to 95 percent of the catalyst is easily removed by centrifuging, the amount removed depending upon conditions such as viscosity of the solution, temperature, type of equipment used, etc. However, in many cases, it is desirable to recover 98 or more percent of the catalyst. For example, the preferred nickel catalyst is comparatively expensive and any reduction in catalyst loss is an advantage. Nickel or any metal catalyst is particularly undesirable where the polymer is used to form electrical insulation material. The catalyst also gives a dark color to the polymer making it unsuitable for such uses as white side walls in automobile tires, etc.

In the copending application of B. B. Buchanan and M. R. Cines having Serial No. 496,932 filed March 25, 1955 a process is disclosed wherein catalyst removal is facilitated by dilution of the crude polymer solution with additional solvent, heating the resulting mixture, and then removing the catalyst from the heat treated mixture. While such method gives greatly improved results, some catalyst particles having a particle size up to 3 microns or even larger remain. By the process of this invention, a large percentage of such fine catalyst is removed. I have now found that the removal of catalyst from a hydrogenated polymer of butadiene by sedimentation can be greatly improved by carrying out the sedimentation in the presence of a montmorillonite clay activated by acid treatment. By sedimentation, I mean a separation accomplished by a unidirectional movement of particles responsive to forces acting thereon such as by gravity or centrifugal forces.

An object of this invention is to improve the removal of catalyst from a mixture of hydrogenation catalyst and hydrogenated polybutadiene by sedimentation.

Other objects and advantages of this invention will be apparent to those skilled in the art having been given this disclosure.

A new class of materials produced by the hydrogenation of rubbery polymers of conjugated dienes and particularly butadiene in the presence of a suitable catalyst is fully disclosed in the copending application of R. V. Jones et al., Serial No. 395,291, filed November 30, 1953. These materials are characterized by their decreased solubility in many common solvents, their increased tensile strengths, their increased resistance to ozone deterioration, and their lowered degree of unsaturation as compared to the unhydrogenated polymer. These products are unique in that although they are thermoplastic, they can be vulcanized. These materials are flexible at temperatures as low as −100° F. and are not brittle at liquid nitrogen temperature, i. e., −200° F.

The materials are prepared by catalytic hydrogenation procedures. It is preferred that the butadiene polymer be dispersed or dissolved in a solvent such as cyclohexane, methylcyclohexane, decalin and the like. Aromatic hydrocarbons such as benzene, toluene, etc., cyclic ethers such as dioxane, and paraffins such as isooctane, isoheptane, normal heptane and hydroaromatics such as tetralin and the like are useful. Among the catalyst which are applicable can be mentioned Raney nickel, copper chromate, molybdenum sulfide, finely divided platinum, finely divided palladium, platinum oxide, copper chromium oxide, and the like. However, nickel-kieselguhr catalyst is the preferred catalyst being far superior to the others tried.

For superior results, the nickel-kieselguhr catalyst is finely divided, having a particle size between 1 to 8 microns and activated at a temperature between 500 and 800° F. for a period of several hours by passing hydrogen thereover. Such treatment reduces at least a part of the nickel, and the reduced nickel can vary from 10 to 50 percent of the total.

The polymer in solvent is charged to the reactor with 2 to 30 weight percent, based on the polymer, of catalyst on an unreduced basis. Hydrogen is charged to the reactor and the reaction conditions are preferably in the range of 1 atmosphere to 3000 p. s. i. g., 75° to 750° F. and for a period of from 1 to 24 hours. More generally a temperature in the range of 300 to 600° F. and a pressure in the range of 400 to 600 p. s. i. g. is used. The polymer concentration in the charge solution is in the range of 3 to 15 weight percent polymer although solutions containing about 5 percent polymer are preferred.

For polymers of desired characteristics, the unsaturation should be reduced to a value of approximately 0 to 50 percent, based upon the theoretical value of 100 percent for the unhydrogenated polybutadiene.

The hydrogenated polymer is then separated from the catalyst. It is an improvement in this separation to which this invention is directed.

The preferred polymer for hydrogenation is a homopolymer or copolymer of butadiene, preferably 1,3-butadiene, wherein the monomer material copolymerized with the butadiene is styrene and the styrene comprises not more than 30 weight percent of the monomers.

According to my invention, the solution of polymer in solvent is controlled within predetermined limits and an activated montmorillonite clay is added to the hydrogenated mixture. The clay and catalyst is then removed by sedimentation such as gravity settling or centrifuging.

As has been indicated, 85 to 95 percent of the catalyst can be removed by sedimentation depending upon the various conditions as indicated. The catalyst remaining generally has a particle size in the range of 1 to 3 microns. Numerous filter aids and coagulants were tested without any appreciable effect on the catalyst removal, but when an activated montmorillonite clay was used a very noticeable improvement was obtained. These data are shown in Table II. As can be seen, this was an unexpected result in view of the fact that well known coagulant and/or filter aids were ineffective. It appears that the mechanism of the montmorillonite on the catalyst is something other than mere coagulation, however, I am not limited to any theory. The montmorillonite clay useful in this invention is described in an article by Davison et al. at pages R–318 to R–321 of "National Petroleum News," issue of July 7, 1943.

The montmorillonite clay useful in this invention occurs in nature and is believed to have the ideal formula $Al_2Si_4O_{10}(OH)_2 \cdot nH_2O$, and an actual formula corresponding to $MgO \cdot Al_2O_3SlO_2 \cdot nH_2O$, since in nature the ideal formula is not realized due to substitution. The natural montmorillonite clay has a crystalline rather than an amorphous or gel structure, as exemplified by silica gel. One apparently typical substitution in the formula of the product as found in nature is partial replacement of aluminum by magnesium. This montmorillonite mutation does not appear to be haphazard, but characteristically every sixth aluminum ion is apparently supplanted by a magnesium ion, and this replacement of a trivalent cation (aluminum) by a divalent cation (magnesium) is believed to give rise to a deficiency in positive charge. The crystal lattice of the ideal montmorillonite unit crystal cell is characterized by a layer configuration, and each layer is believed to consist of four sheets of oxygen, between the outer sheets of which in the tetrahedral position are located the silicon atoms; in the octahedral position are the aluminum atoms, and in the same oxygen sheets which form the boundaries of the octahedrals are the hydroxyl ions. The deficiency in positive charge caused in the neutral product by the replacement of the trivalent cation by the divalent cation causes the lattice to become negatively charged, and in order to neutralize this charge, various types of cations are absorbed on the crystal protruding into the water of hydration space between the layers of montmorillonite. The cations, being exposed, are subject to mass action effects and are readily replaceable, thus giving rise to the phenomenon of base exchange which is characteristic of the substituted montmorillonite.

The raw montmorillonite clay is commonly classified as a non-swelling bentonite and is sometimes referred to as a subbentonite.

The montmorillonite is activated by contact with an acid. The acid contact replaces exchangeable ions with hydrogen, i. e. the surface cations originally present in a magnesium substituted montmorillonite lattice are replaced by hydrogen ions as a result of the activation. Thus, the activated material may be termed a magnesium substituted hydrogen montmorillonite.

As has been indicated, the hydrogenated polymer will be in solution. The viscosity of these solutions is affected by temperature, concentration and degree of hydrogenation. That is, such a solution at a high temperature, low concentration and a low degree of hydrogenation is more fluid (less viscous) than are solutions at a lower temperature, higher concentration or higher degree of hydrogenation. If the viscosity of hydrogenated polymer solutions at various concentrations and degree of unsaturation is plotted against temperature, all of these curves will show an increasing viscosity with decreasing temperatures with a sharp break in the curve occurring just before the visible gel point. At temperatures above this point, the concentration of the solution has a substantial effect upon viscosity. If the concentration of the solution is below about five percent polymer, the effect of temperature and degree of unsaturation is negligible and the breaking point in the curve occurs at about 85° F. For these reasons, is is necessary to reduce the concentration to five percent polymer or lower, preferably 2–4 percent and to maintain the temperature in the sedimentation vessel or apparatus to at least 85° F.

To the concentration adjusted solution, the activated montmorillonite clay is added at a ratio of between 1 and 5 weight parts clay per part catalyst. It, of course, is not critical when the clay is added and is within the scope of the invention to add the clay at any time, e. g., before dilution, after a portion of the catalyst is removed etc. Also greater amounts of clay can be used, however amounts greater than 5 parts clay per part catalyst is generally not required. For optimum results, the clay is generally used in a weight ratio of clay to catalyst of at least 1:1 and for best results, at least 2 parts clay per part catalyst is preferred. The clay can be separated from the catalyst by magnetic separation or by air separation after drying or reactivation of said catalyst.

The advantages of this invention are best shown by the following examples. In these examples, the crude hydrogenated polybutadiene was produced in a batch reactor by dissolving 15.05 pounds of polybutadiene in 280 pounds of methylcyclohexane and the mixture hydrogenated in the presence of 2.25 pounds of nickel-kieselghur catalyst. Analysis of the effluent showed 5.1 percent polymer plus catalyst and 149 parts catalyst per 1000 parts polymer (PPT). All parts are by weight unless otherwise specified.

EXAMPLE I

A portion of the above described hydrogenated polymer (about 5 percent polymer in crude solution) was centrifuged at 2000 R. P. M. (650 gravities) for various periods of time both with and without activated montmorillonite clay and with and without benefit of dilution with additional methylcyclohexane (MCH). These centrifuging conditions are very mild and the removal of catalyst is not as good as would be accomplished with a high speed centrifuge, say 9000 gravity. On the other hand, the data are comparative and show the great improvement obtainable in catalyst removal when operating under the conditions of this invention. The temperature of material charged to the centrifuge was approximately 130° F. and the temperature at the end of this period was approximately 85° F.

*Table I*

| Run | ml. charged | Parts Clay | Parts clay/ parts cat. | Parts Crude | Parts MCH | Time | Parts Cat. PPT |
|---|---|---|---|---|---|---|---|
| 1 | 50 | 0 | 0 | 100 | 0 | 15 | >50 |
| 2 | 50 | 0 | 0 | 100 | 100 | 5 | 19.8 |
| 3 | 50 | 1 | 1.32 | 100 | 0 | 15 | 21.15 |
| 4 | 50 | 1 | 6.6 | 20 | 0 | 15 | 19.8 |
| 5 | 50 | 1 | 1.32 | 100 | 100 | 5 | 17.05 |
| 6 | 50 | 1 | 6.6 | 20 | 20 | 5 | 7.82 |

From the above data, it is seen that a small amount of clay has the same effect on catalyst removal as does dilution alone. On the other hand, when clay and dilution are both used, a marked improvement is shown

EXAMPLE II

In this run a hydrogenated polymer of butadiene prepared similarly to the above described method and diluted with MCH to 1.5 percent polymer was warmed to 140° F. Various known filter aids or agglomeration materials were added and vigorously mixed for two hours. The material was then centrifuged for 2 minutes at 2700 R. P. M. (1300 gravities). In each of these runs the color was compared to the control. The results are tabulated below.

*Table II*

| Run Control | Additive | Physical form | Percent Based on Cat. | Observation |
|---|---|---|---|---|
| 1 | | | | 85% removed. |
| 2 | Diatomaceous earth | Slurry in MCH | 30 to 900 | No improvement. |
| 3 | Potassium alum | 1% aqueous sol | 1 to 10 | Do. |
| 4 | Barium nitrate | do | do | Do. |
| 5 | Sodium Chloride | do | do | Do. |
| 6 | do | Sat. sol | 100 and 1,000 | Coagulated the solids. |
| 7 | Calcium chloride | 1% aqueous sol | 1 to 10 | No improvement. |
| 8 | Isopropyl alcohol | do | do | Do. |
| 9 | Ethyl alcohol | do | do | Do. |
| 10 | Calcium oxide | 0.1% aq. sol | 0.1 to 2 | Do. |
| 11 | Water | | 1 to 2,000 | Do. |
| 12 | Mineral Oil | Liquid | 25 to 900 | Do. |
| 13 | Trio-(monyl phenyl) phosphite | do | do | Do. |
| 14 | Anion exchange resin | Solids | Packed column | Slight improvement. |
| 15 | Trimethyl cetyl ammonium chlorophenate | 25% aq. sol | 10 to 500 | Do. |
| 16 | Fatty-alcohol sulfate amine salt | Liquid | 0.5 to 50 | Do. |
| 17 | Acetone | 0.1 aq. sol | 0.1 to 50 | No improvement. |
| 18 | Activated montmorillonite clay | Dry powder | 20 [a] | Do. |
| 19 | do | do | 150 [a] | Some improvement. |
| 20 | do | do | 500 [a] | Complete clarification. |
| 21 | do | do | 2,000 [a] | Do. |
| 22 | do | do | 200 [b] | No improvement. |
| 23 | do | do | 200 [c] | Complete clarification. |
| 24 | Activated charcoal | do | 200—500 | No improvement. |

[a] Total polymer plus catalyst content of polymer solution was 1.5 percent.
[b] Total polymer plus catalyst content of polymer solution was 5.0 percent.
[c] Total polymer plus catalyst content of polymer solution was 2.5 percent.

From the above data, it can be seen that when the activated clay is used in the range as disclosed by the specification, a marked improvement in catalyst removal by centrifuging is obtained. This effect is wholly unexpected in view of the slight or no improvement obtained by these other materials.

EXAMPLE III

A chemical analysis was made on the control and the montmorillonite treated centrifuged solutions from above. The results are tabulated.

*Table III*

| Run From Table II | Percent Catalyst Removed |
|---|---|
| Control | 85 |
| 20 | 98.4 |

This analysis again points up the advantage to be gained by the use of the activated montmorillonite.

This invention has been described in one of its preferred embodiments. Those skilled in the art will see many modifications which can be made in the practice of this invention without departing from the scope thereof.

I claim:

1. The process of separating hydrogenation catalyst from a solution of hydrogenated polymer said solution containing not more than 5 percent polymer and said polymer being prepared by polymerizing monomeric material comprising at least 50 weight percent conjugated diene the balance being an aryl olefin said process comprising adding at least one part by weight of an acid activated montmorillonite clay per part catalyst to said polymer solution and separating said clay and catalyst from said polymer solution by sedimentation at a temperature of at least 85° F.

2. The process of claim 1 wherein said sedimentation is accomplished by gravity settling.

3. The process of claim 1 wherein said sedimentation is accomplished by centrifuging.

4. An improvement in the process of removing hydrogenation catalyst from a solution of hydrogenated butadiene polymer selected from the group consisting of rubbery homopolymers of butadiene and copolymers of butadiene containing not more than 50 weight percent styrene said improvement comprising adjusting the concentration of polymer in said solution to not more than 5 percent, maintaining the temperature above the gel temperature and separating the resulting adjusted solution by sedimentation in the presence of a magnesium substituted hydrogen montmorillonite clay, said clay being present in a weight ratio of at least one part clay per part catalyst.

5. The process of separating a nickel on kieselguhr catalyst from a solution of a hydrogenated polymer of a butadiene prepared from polymerizing monomeric material comprising at least 70 weight percent butadiene the balance being styrene, dispersing said polymer in a suitable solvent and hydrogenating said polymer thus dispersed in presence of said catalyst, said process comprising adjusting the concentration of resulting hydrogenated polymer in said solvent to not more than 5 percent and centrifuging the resulting solution at a temperature of at least 85° F. in the presence of montmorillonite clay activated by washing with an acid, said clay being in a weight ratio in the range of one to five parts clay per part catalyst.

6. The process of claim 5 wherein the said polymer is a homopolymer of 1,3-butadiene.

7. The process of claim 5 wherein said polymer is a copolymer of 1,3-butadiene and styrene.

8. A process for producing thermoplastic materials which comprises admixing (A) a substantially gel free polymeric material selected from the group consisting of rubbery homopolymers of butadiene and copolymers of butadiene containing not over 30 weight percent styrene; (B) a solvent and disperser for said polymeric material; and (C) a hydrogenation catalyst; contacting the mixture with hydrogen at sufficient pressure and time to reduce the unsaturation at least 50 percent; adjusting the concentration of the thus hydrogenated polymer to a level in the range of 2 to 4 percent; admixing an acid activated montmorillonite clay in the hydrogenated solution; said clay being in a weight ratio in the range of 1 to 5 parts clay per part of said catalyst; and separating the resulting mixture to separate clay and catalyst therefrom by sedimentation at a temperature of at least 85° F.

9. The process of claim 8 wherein the sedimentation is accomplished by gravity settling.

10. The process of claim 8 wherein the sedimentation is accomplished by centrifugal force.

11. A process for producing thermoplastic materials which comprises admixing (A) a polymeric material selected from the group consisting of rubbery homopolymers of 1,3-butadiene and rubbery copolymers of 1,3-butadiene and styrene wherein the styrene is not more than 30 weight percent; (B) a solvent and disperser for said polymer; and (C) 2 to 20 percent by weight based on said polymer of a nickel-kieselguhr catalyst having a particle size of 1 to 8 microns and which has been activated by contact with hydrogen at a temperature in the range of 500 to 800° F.; contacting the mixture with hydrogen for 2 to 8 hours at a temperature in the range of 300 to 600° F. at a pressure in the range of 400 to 600 p. s. i. g.; admixing magnesium substituted hydrogen montmorillonite clay in a weight concentration in the range of 1 to 5 parts clay per part catalyst in the resulting hydrogenated solution; adjusting the said resulting hydrogenated solution to a concentration of not more than 5 percent; and centrifuging the resulting admixture at a temperature of at least 85° F. to separate catalyst and clay from said resulting solution.

References Cited in the file of this patent

UNITED STATES PATENTS 2,493,584 Kern ------------------- Jan. 3, 1950